(12) United States Patent
Jackson et al.

(10) Patent No.: US 7,472,045 B2
(45) Date of Patent: Dec. 30, 2008

(54) METHOD FOR PERTURBATING A NUCLEAR REACTOR CORE FUEL BUNDLE DESIGN TO GENERATE A GROUP OF DESIGNS

(75) Inventors: Roland Otto Jackson, Wilmington, NC (US); William Earl Russell, II, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 47 days.

(21) Appl. No.: 11/610,197

(22) Filed: Dec. 13, 2006

(65) Prior Publication Data

US 2008/0144763 A1    Jun. 19, 2008

(51) Int. Cl.
G06F 17/10  (2006.01)

(52) U.S. Cl. .............. 703/2; 703/6; 376/241; 376/267; 376/305

(58) Field of Classification Search .......... 703/2, 703/6, 13, 22; 376/267–272, 241, 305
See application file for complete search history.

(56) References Cited

U.S. PATENT DOCUMENTS

| | | | |
|---|---|---|---|
| 5,272,736 A | 12/1993 | Wolters et al. | |
| 5,790,616 A | 8/1998 | Jackson | |
| 5,822,388 A | 10/1998 | Kantrowitz et al. | |
| 6,181,762 B1 | 1/2001 | Akerlund et al. | |
| 6,748,348 B1 * | 6/2004 | Russell, II | 703/6 |
| 6,862,329 B1 * | 3/2005 | Kropaczek et al. | 376/267 |
| 6,891,912 B1 | 5/2005 | Lukic et al. | |
| 6,934,350 B1 * | 8/2005 | Challberg et al. | 376/353 |
| 2003/0086520 A1 | 5/2003 | Russell et al. | |
| 2003/0123600 A1 | 7/2003 | Hesketh et al. | |
| 2004/0101083 A1 | 5/2004 | Russell et al. | |
| 2004/0122629 A1 | 6/2004 | Russell et al. | |
| 2004/0122632 A1 | 6/2004 | Kropaczek et al. | |
| 2004/0151274 A1 | 8/2004 | Kropaczek et al. | |
| 2004/0191734 A1 | 9/2004 | Russell et al. | |
| 2004/0220787 A1 | 11/2004 | Russell et al. | |
| 2004/0236544 A1 | 11/2004 | Russell, II et al. | |
| 2004/0243370 A1 | 12/2004 | Kropaczek et al. | |
| 2005/0015227 A1 | 1/2005 | Kropaczek et al. | |
| 2005/0086036 A1 | 4/2005 | Kropaczek et al. | |
| 2006/0149512 A1 | 7/2006 | Kropaczek et al. | |
| 2006/0149514 A1 | 7/2006 | Kropaczek et al. | |
| 2006/0167566 A1 | 7/2006 | Kropaczek et al. | |

\* cited by examiner

*Primary Examiner*—Russell Frejd
(74) *Attorney, Agent, or Firm*—Nixon & Vanderhye P.C.

(57) ABSTRACT

A method has been developed to select fuel rod enrichments for a fuel bundle of a nuclear reactor, the method including: creating an ordered list of fuel rod types in an initial fuel bundle design; perturbing at least a subset of the fuel rod types in the initial fuel bundle design to generate a plurality of perturbed fuel bundle designs; selecting perturbed fuel bundle designs having fuel rods with allowable fuel enrichment types and an allowable average enrichment for the perturbed bundle; determining a difference between each of the selected perturbed fuel bundle design and the initial fuel bundle design, and creating a group of the perturbed fuel bundle design having a difference less than a predetermined threshold difference value.

20 Claims, 3 Drawing Sheets

METHOD FOR PERTURBATING A NUCLEAR REACTOR CORE FUEL BUNDLE DESIGN TO GENERATE A GROUP OF DESIGNS

BACKGROUND OF THE INVENTION

The present invention relates to fuel design for boiling water nuclear reactors (BWR). In particular, the invention relates to determining fuel rod enrichments for fuel bundles to be used in the core of a nuclear reactor.

A typical core in a BWR contains 200 to 900 fuel bundles. Each fuel bundle includes an array, e.g., a two-dimensional (2D) lattice, of fuel rods. For each bundle, a designer selects the enrichment value for each rod in the lattice of the bundle. The enrichment values are selected based on design constraints of the BWR, such as peaking limits and R-factor constraints.

The fuel rods, also referred to as "pins", include stacks of fuel pellets. A pellet is a composite of fissile material (for our purposes U235) and gadolinia burnable poison for reactivity control. The pellets are available in different types, where each type has a unique composition and different enrichment value. The pellets in a single fuel rod generally have a common composition. The pellet composition determines the enrichment value of a fuel rod.

The local power in the bundle is a function of the individual rods surrounding a particular rod. The weighted local power factor is called an R-factor. The R-factor correlates thermal hydraulic variables (such as flow rate, inlet subcooling, system pressure, hydraulic diameter) to a lattice fuel rod power peaking distribution. Exposure peaking is related to the integral of the local peaking of each individual fuel pin and is constrained by the maximum licensed exposure capability of the fuel.

Because local peaking and R-factor values in a fuel bundle are directly proportional to MAPLHGR limits (KW/ft limits) and minimum critical power ratio (MCPR) limits, it is beneficial to minimize the local peaking and R-factor values while meeting other bundle design criteria such as bundle average enrichment, hot-to-cold swing (reactivity excursion at beginning of cycle (BOC) from hot, uncontrolled conditions to cold, controlled conditions), and overall exposure dependent reactivity. Exposure is considered in designing a fuel bundle because a high exposure peaking factor limits the maximum bundle exposure and therefore the maximum reload enrichment that can be loaded in the reactor.

Complexity in a nuclear fuel design is a natural consequence of the need to achieve target attributes for fuel rods and bundles. The simplest fuel bundle lattice design would contain fuel rods all having a uniform enrichment. This simplest lattice design would be efficient and economical to design and manufacture.

A fuel bundle with rods having a single enrichment value would most likely fail to satisfy local peaking and/or reactivity requirements of the BWR nuclear reactor core. To achieve these BWR requirements, fuel bundles are formed of fuel rods having various enrichments. While including a variety of fuel rod enrichments in a bundle assists in satisfying BWR requirements, the enrichment variety increases the complexity of the bundle design and the assembly of rods into the bundles.

A method is disclosed in Published U.S. Patent Application 2004-0,236,544 A1 ('544 application) now U.S. Pat No. 7,280,946 for determining fuel rod (pin) enrichments and lattice locations for a fuel bundle of a nuclear reactor. The disclosed method accepts input parameters and target conditions, and determines enrichment values for all rods in a bundle, e.g., a lattice design. The target conditions may reflect bundle design constraints which may include: (i) lattice average enrichment, (ii) local peaking factors, (iii) R-factors, and (iv) exposure peaking factors. The method disclosed in the '544 application uses a response matrix analysis to estimate the impact on nearby fuel rods effects of enrichment changes to a particular rod in the lattice. The method disclosed in the '544 Application outputs a bundle design (or lattice design) specifying enrichments for the rods at each of the lattice location. The bundle design satisfies the target conditions, e.g., design constraints.

The bundle design will typically have fuel rods of various enrichment values. Having rods of various enrichment values increases the complexity of the fuel bundle. The costs of manufacturing fuel bundles increases as the number of enrichment values in the bundle increases. Simplifying fuel bundle designs by decreasing the number of different enrichment values used in a fuel bundle has the potential reducing the cost of making bundles.

There is a long felt need for methods and systems that facilitate the design of fuel bundles. In particular, there is a need for methods and systems that assist in optimizing fuel bundles that satisfy BWR requirements application constraints and minimize costs of manufacture of fuel bundles. There is further a long felt need for methods and systems to simplify fuel bundle designs by reducing the variety of rod enrichments in a bundle.

BRIEF DESCRIPTION OF THE INVENTION

The method disclosed herein is applicable to simplifying the selection of suitable fuel enrichment values for a bundle, including the selection of rod enrichment values for each rod lattice location. There is a tremendous complexity to the selection of enrichment values for fuel rods, e.g., pins, and the placement of the selected rods in the lattice of a bundle. The complexity is due to the variety of rod enrichments that may be selected for each rod location in a bundle.

A method has been developed to select fuel rod enrichments for a fuel bundle of a nuclear reactor, the method including: creating an ordered list of fuel rod types in an initial fuel bundle design; perturbing at least a subset of the fuel rod types in the initial fuel bundle design to generate a plurality of perturbed fuel bundle designs; selecting perturbed fuel bundle designs having fuel rods with allowable fuel enrichment types and an allowable average enrichment for the perturbed bundle; determining a difference between each of the selected perturbed fuel bundle design and the initial fuel bundle design, and creating a group of the perturbed fuel bundle design having a difference less than a predetermined threshold difference value.

A method has been developed to select fuel rod enrichments for a fuel bundle of a nuclear reactor, the method comprising: creating an ordered list of fuel rod types in an initial fuel bundle design, wherein the list ranks fuel rod types by frequency of occurrence in the initial fuel bundle design; selecting a subset of fuel rods in the initial fuel bundle design, wherein the subset includes fuel rods of the types having a frequency below a predetermined frequency cutoff; perturbing only the subset of the fuel rod types in the initial fuel bundle design to generate perturbed fuel bundle designs corresponding to combinations and perturbations of the fuel rods in the subset; selecting perturbed fuel bundle designs having fuel rods with allowable fuel enrichment types and an allowable average enrichment for the perturbed bundle; determining a difference between an enrichment value for each the selected perturbed fuel bundle designs and an enrichment value of the initial fuel bundle design, wherein the enrichment value for the perturbed fuel bundle designs is determined using a response matrix to estimate an impact on local peaking and R-factors for the perturbed fuel bundle design, and creating a group of the perturbed fuel bundle design having a difference less than a predetermined threshold difference value.

A grouping of fuel bundle designs for a nuclear reactor core have been developed where the group comprises perturbed fuel bundle designs for a core of a nuclear reactor, wherein each of the perturbed fuel bundle designs has an enrichment value difference within a predefined tolerance range of an enrichment value difference of an initial fuel bundle design; each of the perturbed fuel bundle designs meeting predefined design constraints for bundles in the core, and each of the perturbed fuel bundle designs being a perturbation of the initial fuel bundle design.

DETAILED DESCRIPTION OF THE INVENTION

A fuel bundle lattice has many locations for fuel rods, e.g., dozens or hundreds of rod locations. The fuel rods in a bundle typically may have one of various enrichment values. Determining fuel rod enrichments involves selecting the enrichment values for each fuel rod and evaluating the impact that the enrichment value has on the operation of the rod and the bundle. Further, the enrichment value of a rod affects the operation of other rods in the lattice. A change of an enrichment value in a rod should be evaluated with respect to the operation of the rod being changed, other rods in the bundle and the operation of the entire bundle. This evaluation is needed for each enrichment change made to each rod in a bundle.

The number of such evaluations becomes immense in a process to simplify a bundle by adjusting enrichments in the lattice of the bundle. A further complication to lattice design simplification results from the availability of only discrete enrichments and gadolinia concentration levels. In particular, rod enrichments values are available at discrete levels. The enrichments for each rod must be selected from one of the available discrete levels. It is generally not practical to treat the design of a bundle as a continuous variable optimization because the available enrichment levels are not a continuously variable parameter.

The method and arrangement disclosed herein may simplify the selection of optimal enrichment distributions for fuel rods in a fuel bundle lattice, by identifying potential distributions that satisfy target local peaking and R-factor requirements. The method adjusts the 2D enrichment distribution, e.g., lattice design. The adjusted lattice design may have a lattice average enrichment different from a previous or base fuel bundle lattice design (collectively an "initial fuel bundle design"). The adjusted lattice design must be evaluated to confirm that its average enrichment and other characteristics satisfy design constraints. The rod enrichment determination may be facilitated by using an optional bundle enrichment analysis or search option, such as a recursive analysis. The method may also use an optional simplification technique, such as a response matrix to estimate effects of enrichment changes. The enrichment search option simplification technique determines if enable bundle enrichment is within specified enrichment criteria. The simplification technique may enable bundles to be designed with a reduced number of fuel rod (pin) enrichment types. Bundles with fewer enrichment types that also function well in a particular reactor also are less costly to build, as the manufacturing process may be streamlined.

Figure 1:
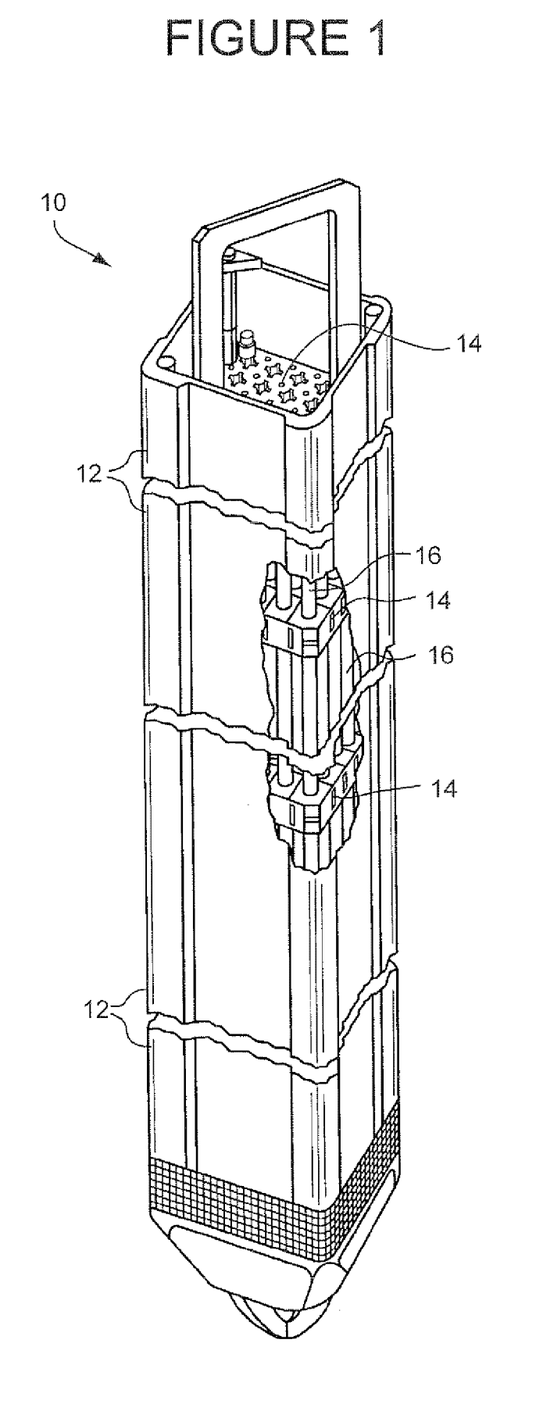
FIG. 1 is a schematic diagram of a conventional fuel bundle.

FIG. 1 illustrates a typical fuel bundle 10 to be inserted in a core of a BWR. Each bundle includes an outer channel 12 surrounding a lattice 14 that supports a group of fuel rods 16. The lattice is typically a rectangular array, e.g., square, of rod locations. Lattices generally include an array of fuel rod positions, such as a 9×9, 10×10 or other N×N array. The rods are loaded in selected lattice positions based on a design for the fuel bundle. The rods are arranged in the lattice such that they extend generally parallel to one another in the channel.

Designing fuel bundles typically fuel involves selecting an enrichment type for each rod from a relatively large number of various enrichment types, e.g., a dozen to twenty different enrichment types. Having a large number of different fuel enrichment types increases the complexity and cost of manufacturing a fuel bundle. Accordingly, there is a need to simplify designs of fuel bundles by reducing the number of various fuel rod enrichment types in any one bundle.

A process, method, and design strategy have been developed for simplifying suitable fuel designs while ensuring that the simplified design satisfies peaking and enrichment requirements for the fuel. The simplification model described herein may be used in conjunction with a process that identifies initial fuel bundle designs that satisfy predetermined peaking and enrichment requirements. Such a process for identifying an initial set of fuel designs, e.g., fuel pellets or fuel pins, is described in Published US Patent Application 2004-0,236,544 A1, now U.S. Pat No. 7,280,946 which is incorporated by reference.

Using an initial fuel bundle design, the simplification model and system described herein provides alternative candidate bundle designs, some of which may have fewer types of fuel rod enrichments than in the initial design. The method perturbs an initial fuel bundle design to generate a list of alternative fuel designs that have slight variations in fuel rod enrichments from the initial bundle design. The method evaluates each of the alternative fuel designs to select those designs satisfying BWR requirements. An individual designer can select suitable fuel bundle design that, for example, has a reduced number of different fuel enrichments. The method disclosed herein facilitates and simplifies the selection process for choosing the one or more acceptable alternative fuel bundle designs.

The problem of designing fuel bundles that satisfies BWR design constraints while minimizing manufacturing cost can be complex. The design constraints to be considered include: (i) lattice average enrichment; (ii) local peaking factors; (iii) R-factors and (iv) exposure peaking factors. R-factor is a characteristic of a BWR bundle design that is associated with vapor film dry-out. R-factors and exposure peaking factors can be considered as functions of local peaking. For simplicity, local peaking is used herein in a general sense to encompass all peaking factor constraints.

Figure 2:
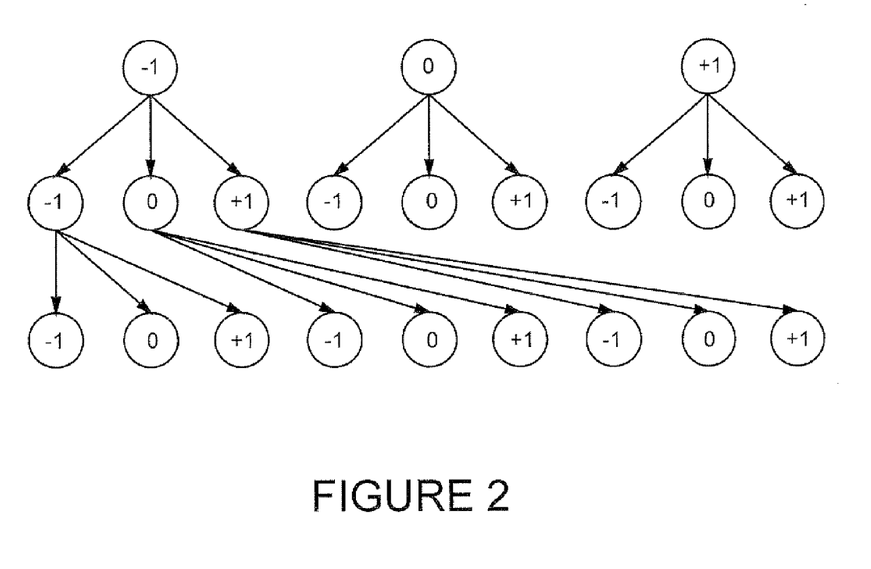
FIG. 2 is a diagram illustrating a recursive analysis to identify candidate fuel bundle enrichment designs from an initial fuel bundle design.

FIG. 2 is a schematic diagram illustrating a combinatoric simplification problem. For a discrete variable optimization problem, a combinatoric approach is fundamentally robust but often requires large computational resources. Combinatorics is a branch of mathematics that studies collections (usually finite) of objects that satisfy specified criteria, deciding when the criteria can be met and finding "largest", "smallest", or "optimal" objects. Combinatorics is used herein to evaluate a large number of alternative fuel bundle designs to identify those bundle designs having relatively few different types of fuel enrichments, satisfying the design constraints on the bundle, and is similar in enrichment characteristics to an initial field bundle design. A combinatoric approach is used to evaluate a large number of perturbations, e.g., candidate lattices, of a fuel bundle design but the processing demand to evaluate each variation. In the method proposed herein, the demand on computational resources may be reduced by filtering out some candidate bundle designs resulting form a recursive analysis, such as by eliminating designs which exceed certain parameters including available enrichment levels and target lattice enrichment levels. The demand on computational resources may also be reduced by using efficient analytical tools, e.g., a response matrix algorithm, to evaluate each candidate fuel bundle design.

The top row of FIG. 1 represents a first fuel rod (see middle circle with zero "0") that can be perturbed up or down one enrichment step. (See plus one "+1" in the right circle and minus "−1" in the left circle). A step represents changing the enrichment of the rod enrichment level up or down one enrichment level. Each perturbation step of the first rod enrichment values represents a unique fuel enrichment type. Row two shows that the three unique fuel enrichment types each can be perturbed. The number of steps, up or down, is called the "depth" of search. In FIG. 1 the depth is 1. As illustrated in FIG. 2, the first enrichment (1) may be perturbed up or down one step. For each perturbation in enrichment (1), the next pellet (see row 2) is also perturbed up one step, down one step and unchanged. This recursive logic continues for each rod in the lattice allowed perturbation list.

To evaluate different potential bundle designs, the enrichment in each of rod (0) is perturbed to generate variations of the bundle design. If the enrichment levels are perturbed by at most one level, e.g., +1 or −1, the depth of the search is one level. A depth of two levels perturbs rods as much as two enrichment levels, e.g., +2, +1, 0, −1 and −2. A search depth of one level may be sufficient to simplify a fuel bundle design by reducing the variety of fuel rod enrichments in the bundle. The methods disclosed herein are not limited to a search depth of one, and may be preformed at search depths of two or more.

As with any model that is based on combinations and permutations the number of options increases very quickly. In the combinatoric model the maximum possible cases is given by:

$$\text{Cases} = (2 \times \text{depth} + 1)^P$$

where "Cases" is the maximum number of cases to evaluate;

"depth" is the depth of search. This is the maximum number of enrichment steps above or below the current enrichment for each pellet. For example, a pellet with a current enrichment of 3.95 with a depth of search of 1 could have enrichments of 3.60, 3.95 and 4.40, and "P" is the number of pellet locations to perturb.

Table I illustrate the magnitude of the problem of generating may candidate fuel bundle designs by combinations and permutations.

TABLE I

| Rod Locations to Perturb | Depth of Search | Max. Number of Candidate Lattices |
|---|---|---|
| 1 | 1 | 3 |
| 2 | 1 | 9 |
| 4 | 1 | 81 |
| 8 | 1 | 6,561 |
| 16 | 1 | 43,046,721 |
| 1 | 2 | 5 |
| 2 | 2 | 25 |
| 4 | 2 | 625 |
| 8 | 2 | 390,625 |
| 16 | 2 | 152,587,890,625 |

As shown in Table I, the number of cases, e.g., candidate lattices (fuel bundle designs), is highly dependent on the number of rod locations and the depth of search. As is evident from Table I, the maximum number of combinations of possible rod enrichment configurations becomes exponentially larger as the depth of search and/or the number of rod locations increase.

Assuming a typical execution time of 15 minutes per perturbation to calculate the impact on local peaking in a candidate lattice, the computational load needed to calculate the impact of each candidate lattice becomes excessive at relatively small numbers of fuel rod locations being perturbed especially if the search depth is greater than one. As an example, for a case of eight (8) rod locations to be perturbed and a search depth of one (1) may require evaluation of as many as 6,561 candidate lattices which translates to over 1600 hours of computation.

The simplification method and system disclosed herein addresses the computational requirements which limit the effectiveness of the combinatorics model by applying response surface methodology to rapidly estimate the impact of each perturbation of local peaking, R-factor and exposure peaking.

The simplification algorithm has the following functions:

A. Create an ordered list of fuel rod types, e.g., enrichment values, in an acceptable fuel bundle design, wherein the list is sorted by the frequency of occurrence of each rod type.

B. Select a subset of rods from the ordered list. The rods in the subset are perturb by adjusting their enrichment values up and down a step (or more). The subset may be the fuel rods corresponding to rod types having a frequency of occurrence in the bundle below a threshold frequency in the bundle.

C. Generate candidate fuel bundle designs for all possible combinations and permutations of the subset of fuel rods.

D. Filter the possible combinations and permutations by allowable fuel enrichment types and the resulting lattice average enrichment. A large number of the perturbed fuel bundle designs may be eliminated from further analysis because the perturbation yields a disallowed fuel rod enrichment value results or the resulting lattice average enrichment of the candidate fuel bundle falls outside an allowable average enrichment range.

E. For each of the possible combinations and permutations passing through the filter, apply a response matrix to estimate the impact on local peaking and R-factors.

F. Based on the response matrix estimates, determine if margin requirements are met for each possible combination and permutation of the filtered fuel bundle designs.

G. Save a listing of fuel bundle designs that satisfy margin requirements. Select one of the saved fuel bundle designs based, at least in part, on the simplicity of the design. For example, select the one of the listed fuel bundle designs having the fewest number of rod enrichment types.

Figure 3:
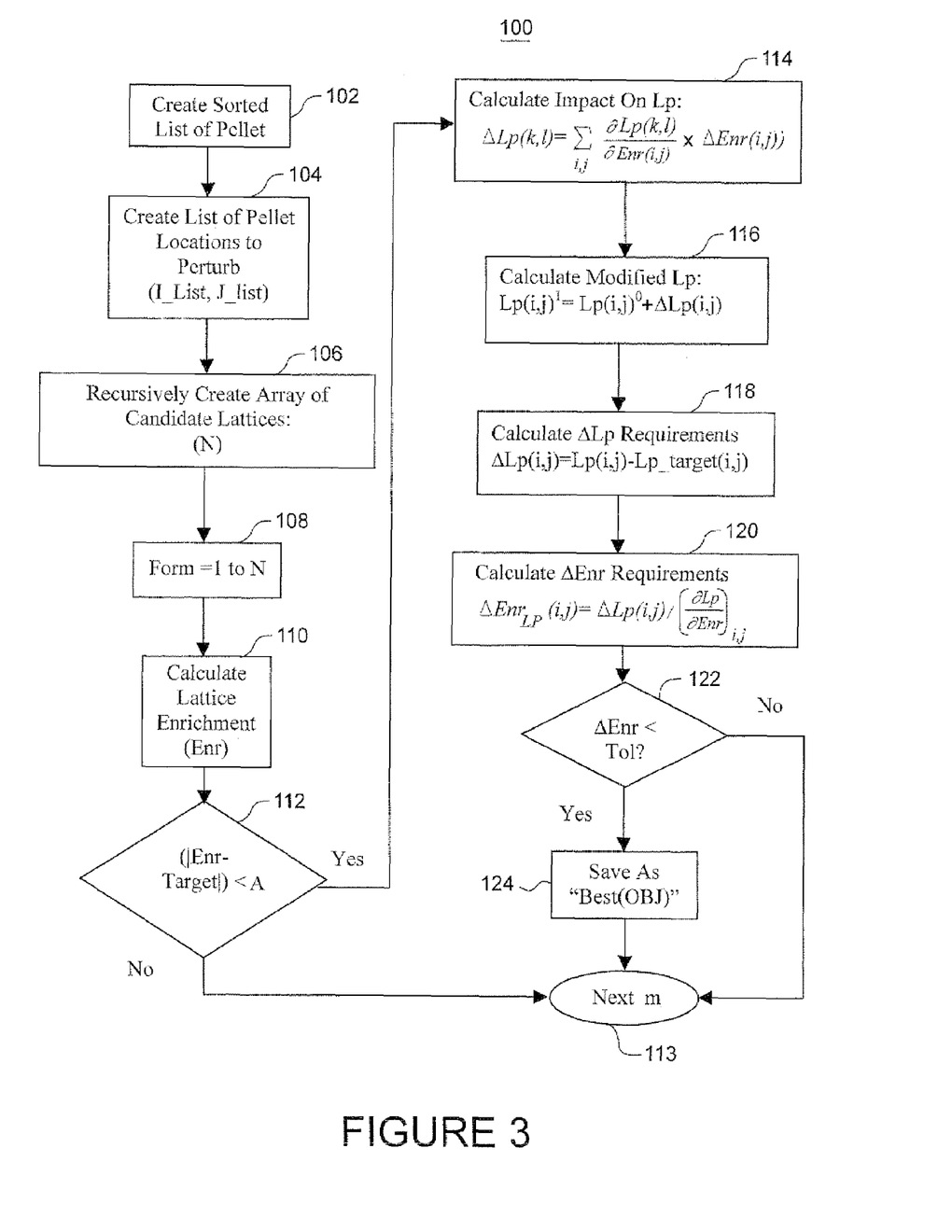
FIG. 3 is a flow chart showing an exemplary algorithm for simplifying a fuel bundle design by identifying alternative fuel bundle designs that satisfy design constraints.

FIG. 3 is a flow chart illustrating one embodiment of the simplification algorithm. The algorithm 100 starts with an initial fuel bundle design that has been determined to satisfy the requirements of the core of the BWR or is a preexisting bundle design used in the core. The initial fuel bundle design may be generated by software programs and systems such as disclosed in U.S. Published Patent Application Serial No. 2004/0236544 now U.S. Pat No. 7,280,946. The initial fuel bundle design may have been previously determined to satisfy design constraints for lattice average enrichment, local peaking factors, R-factors and exposure peaking factors.

The initial fuel bundle design may not be optimal at least with respect to the number of different types of fuel rod enrichment. The initial bundle design may be simplified by reducing the number of different types of fuel rod enrichments. The reduction of enrichment types is to be accomplished without unduly altering the enrichment characteristics of the fuel bundle and without exceeding the design constraints on the rod or bundle. The algorithm 100 is intended to identify alternative fuel bundle designs, having similar enrichment characteristics to the initial bundle design and within the design constraints.

A sorted list (step 102) is created of the fuel rod enrichment types, e.g., pellet types, in the initial fuel bundle. For each enrichment type, the list identifies the number of fuel rods in the lattice of the initial fuel bundle of that type. The list is sorted such that the enrichment types are ranked by the frequency of occurrences of fuel rods with each type of enrichment. For example, the list would include a first row identifying the fuel rod enrichment value that occurs the least frequent in the bundle, a second row identifying the fuel rod enrichment value that occurs next least frequently, and so on until the last row of the list identifies the enrichment value that occurs most frequently in the rods of the bundle.

In step 104, a second list, e.g., a two-dimensional map (I_List, J_List), is created that maps the lattice locations of each fuel rod in the initial fuel bundle design and identifies the enrichment value of each fuel rod in the bundle. The second list identifies the fuel rods to be perturbed to recursively create candidate alternative fuel bundle designs, e.g., the candidate lattices. The two-dimensional map need not identify all fuel rods in the lattice of the initial fuel bundle design. The two-dimensional map may identify only a subset of fuel rods in the initial fuel bundle. The subset may be those fuel rods having enrichments that occur less frequently in the initial fuel bundle. For example, subset of fuel rods to be perturbed may be fuel rods having an enrichment type that occurs in no more than six rods in the initial fuel bundle.

Establishing a subset of fuel rods to perturb reduces the complexity of the analysis of the initial fuel bundle design. Selecting a subset of fuel rod enrichments that occur less frequently in the initial fuel bundle avoids perturbation of fuel rods having more common enrichment types. It is unlikely that more common fuel enrichment types can be eliminated to simplify the fuel bundle design, and still comply with design constraints and not unduly change the enrichment characteristics of fuel bundle. Eliminating fuel rods having frequently occurring enrichments reduces the rods to be perturbed in the recursive analysis and does not materially reduce the robustness of the combinatorics approach. The selection of the subset of fuel rods to be perturbed is dependent on the design of the initial fuel rod bundle and other factors specific to each fuel rod, bundle and processing capacity of the fuel bundle design system.

In step 106, a recursive analysis is performed on the enrichment values of the fuel rods identified in the second list. If a subset has been selected in step 104, the recursive analysis will be performed only on the fuel rods in the subset. The recursive analysis creates an array of candidate lattices (N) each of which includes one or more perturbed fuel rods having enrichment vales which differ form the corresponding fuel rods in the initial fuel bundle design. The recursive analysis is performed at a search depth, e.g., one level, that may be selected by the individual designing the fuel bundles. A search level of one may be suitable for most bundle simplification processes. A search depth greater than two may require computational resources beyond those reasonably available to a fuel designer.

The recursive analysis perturbs the enrichment value of each fuel rod in the second list from the enrichment value specified for the rod in the initial fuel bundle. The analysis creates an array of candidate lattices, e.g., perturbed fuel bundle designs, for every combination and perturbation of fuel rods in the second list. The recursive analysis is illustrated in FIG. 2 and in the text associated with the figure and with Table I. As shown in FIG. 2, the recursive analysis may create a tree structure of candidate lattices, wherein the tree expands downward as the rods are perturbed. A check may be incorporated in the recursive analysis that detects when a fuel rod is perturbed to a disallowed enrichment value and stops further progression of the recursive analysis along the tree branch having the disallowed enrichment value(s).

The product of the recursive analysis is a listing of candidate lattices, e.g., fuel bundle design, that are perturbations of the initial fuel bundle design. These candidate lattices are each evaluated to determine if the candidate complies with design constraints, e.g., average lattice enrichment targets, and whether the local peaking and the R-factor of the candidate is similar to those characteristics of the initial fuel bundle.

For each candidate lattice (step 108), the lattice enrichment (Enr) is determined (step 110) and compared to a target enrichment value. If the difference between the calculated enrichment (Enr) of a candidate lattice and the target enrichment (Target) is greater than a threshold value (A) in step 112, the candidate lattice is discarded (step 113) and steps 110 and 112 are repeated for the next candidate lattice. Alternatively, if an absolute difference (|Enr-Target|) between the calculated enrichment (Enr) of a candidate lattice and the target enrichment is less than a threshold (A), the algorithm 100 proceeds to calculate the impact on local peaking (Lp) of the perturbation the candidate lattice in step 114. Threshold A is a tolerance level that can be adjusted to increase or decrease the number of candidate lattices passing the filter in step 112.

The impact on local peaking ($\Delta Lp$) across the candidate lattice design is calculated using a response surface matrix, in step 114. The response surface matrix is used to determine changes in enrichment, local peaking, exposure peaking and R-factor for a given fuel bundle lattice. A response surface may define relationships between design inputs, including characteristics such as bundle data related to MCPR, MAPLHGR and maximum fraction of limiting power density (MFLPD), which is a ratio of the local LHGR to a linear heat generation rate limit curve (LHGRlimit), characteristics such as R-factor data of a base lattice design to be evaluated, lattice data such as current fuel and poison enrichments in the base lattice design, etc., and one or more operational outputs (i.e., reactor power, flow rate, cycle time, etc.) of a reactor core design using the evaluated fuel bundle.

A given candidate lattice design may be evaluated using a response surface matrix as described by the following expression (1), where the change in local peaking factors is a function of the individual fuel rod enrichment changes.

$$\begin{bmatrix} \Delta P_1 \\ \Delta P_2 \\ \vdots \\ \Delta P_n \end{bmatrix} = \begin{bmatrix} \frac{\partial P_1}{\partial e_1} & \frac{\partial P_1}{\partial e_2} & \cdots & \frac{\partial P_1}{\partial e_n} \\ \frac{\partial P_2}{\partial e_1} & \frac{\partial P_2}{\partial e_2} & \cdots & \\ & & \ddots & \\ \frac{\partial P_n}{\partial e_1} & & & \frac{\partial P_n}{\partial e_n} \end{bmatrix} \times \begin{bmatrix} \Delta e_1 \\ \Delta e_2 \\ \vdots \\ \Delta e_n \end{bmatrix} \quad (1)$$

The n×n matrix in expression (1) corresponds to a response surface matrix, where each element may be defined as:

$\partial P_i / \partial e_j$ is the change in local peaking in a fuel rod (i) for a change of enrichment in rod (j);

$\Delta e_i$ is the change in pellet enrichment in fuel rod i, where i is from 1 to n, and $\Delta P_i$ is the change in local peaking in fuel rod i.

The diagonal elements (i=j) in expression (1) represents changes in local peaking of the perturbed fuel rod due to the enrichment change to that rod. If enrichment is changed (either up or down) in a rod at a given lattice location, the local rod power may be expected to go up or down by some amount. The amount of change in local rod power is represented by $\partial P_i / \partial e_j$ in expression (1) above. Other fuel rods, e.g., pins, near the perturbed fuel rod may also change in power. The power response of these nearby fuel rods is represented in the off diagonal terms in expression (1).

The response matrix provides a convenient tool for determining the local peaking impact on all rods in a bundle due to a change in enrichment of one fuel. A more detailed description of using a response matrix to determine the impact on local peaking ($\Delta Lp$) is provided in commonly owned US Published Patent Application Serial No. 2004/0236544, which is incorporated by reference herein.

Once the local impact across the bundle is calculated in step 114, a modified local peaking is calculated in step 116 for each rod and based on the changes in local peaking, changes in exposure peaking and change in R-factor due to the pellet enrichment change. A calculation is made of the change in local peaking, exposure peaking and R-factor requirements (step 118) and the change in enrichment requirements (step 120). These calculations may be performed using the response surface matrix. A change in local peaking requirements is determined (step 118) as a difference between the local peaking values in the initial fuel bundle lattice design (Lp_target (i,j)) and the local peaking requirements for the candidate lattice (Lp(i,j)).

The change in enrichment requirements ($\Delta Enr$) is the change in enrichment requirements between the candidate lattice and the initial fuel bundle, with respect to local peaking and R-factor (step 120). The change in enrichment requirements may be determined as a function of the change in local peaking and therefore change in exposure peaking and R-factor. By dividing the change in local peaking requirement by the derivative of change in local peaking to change in enrichment (see step 120), a resultant change in enrichment requirement ($\Delta Enr$) is determined.

The change enrichment requirement ($\Delta Enr$) is with respect to the initial bundle design and represents the impact of the perturbations used to create the candidate design has on the initial bundle design. If the change enrichment requirement ($\Delta Enr$) is excessive, e.g. beyond a tolerance (Tol) the candidate lattice is discarded (No), step 122.

If the change enrichment requirement ($\Delta Enr$) is within tolerance (Tol), the candidate lattice is deemed acceptable in that it is sufficiently similar to the initial fuel bundle design and satisfy the design constraints, e.g. exposure peaking and R-factor. The acceptable candidate lattice designs are stored in a list 124 that can be evaluated by an individual fuel designer. The list may include the initial bundle design. The designer may select the acceptable candidate lattice design having the fewest types of fuel rod enrichment types and thereby select the simplest acceptable bundle design. The designer may also select one of the acceptable candidate fuel bundles based on criteria other than just simplicity.

The exemplary embodiments of the present invention may provide several advantages. The method and arrangement may enable production of fuel bundles having a desired local peaking and R-factor performance. Consequently, given fuel cycles typically may be loaded and operated such that less fuel may be needed for identical cycle lengths, potentially resulting in improved fuel cycle economics. Additionally, because fuel bundle development may require fewer iterations, there may be a significant cycle time reduction in the bundle design process, potentially reducing cost and enhancing profitability.

The method and arrangement for determining pin enrichments for a fuel bundle of a nuclear reactor may include a computer system, a graphical user interface (GUI) and a processing medium (e.g., software-driven program, processor, application server, etc.) to enable a user to determine pin enrichments for a fuel bundle of a nuclear reactor. The processing medium and GUI may be executed on a conventional computer including: a processor for executing the GUI and processing medium; data storage coupled to the processor having the processing medium and GUI and including data pertinent to the fuel rods and nuclear core; input devices, e.g., a keyboard and data connections to sources of data accessed by the processing medium, and output devices, e.g., displays and printers.

A technical effect of the algorithm disclosed herein is to provide an efficient and effective means to simplify designs of fuel bundles by identifying candidate lattices that are acceptable and have a reduced set of different pin enrichment types.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to select fuel rod enrichments for a fuel bundle of a nuclear reactor, the method comprising:
    creating an ordered list of fuel rod types in an initial fuel bundle design;
    perturbing at least a subset of the fuel rod types in the initial fuel bundle design to generate a plurality of perturbed fuel bundle designs;
    selecting perturbed fuel bundle designs having fuel rods with allowable fuel enrichment types and an allowable average enrichment for the perturbed bundle;
    determining a difference between each of the selected perturbed fuel bundle design; and the initial fuel bundle design, and
    creating a group of the perturbed fuel bundle designs having a difference less than a predetermined threshold difference value.

2. A method in claim 1 further comprising selecting a fuel bundle design from the group of the perturbed fuel bundle designs, wherein the selected fuel bundle design is simpler than the initial fuel bundle design.

3. A method as in claim 1 wherein the ordered list is sorted by the frequency of occurrence of each rod type in the bundle.

4. A method as in claim 1 wherein the subset is all fuel rod types having a frequency of occurrence in the bundle of no greater than a threshold level.

5. A method as in claim 1 wherein only the fuel rod types in the subset are perturbed.

6. A method as in claim 1 wherein the step of perturbing is performed to a search depth of one level such that each perturbed fuel rod is perturbed up one fuel enrichment value and perturbed down one fuel enrichment value.

7. A method as in claim 1 wherein all fuel rods in the subset are perturbed, and a fuel bundle design is generated for all possible permutations and combinations of the subset of the fuel rods for a predefined depth of search.

8. A method as in claim 7 wherein fuel bundle designs are not generated for perturbations which exceed an allowable rod enrichment value.

9. A method as in claim 1 wherein determining the difference includes determining a difference between an enrichment value of each of the perturbed fuel bundle designs and an enrichment value of the initial fuel bundle design.

10. A method as in claim 9 wherein the enrichment value is determined using a response matrix to estimate an impact on local peaking and R-factors for each of the perturbed fuel bundle designs.

11. A method as in claim 9 further comprising determining if margin requirements are met based on the response matrix estimates for each of the perturbed bundle designs.

12. A method of claim 1 further comprising selecting one of the group of the perturbed fuel bundle designs having a fewest number of rod enrichment types of the perturbed fuel bundle designs in the group.

13. A method to select fuel rod enrichments for a fuel bundle of a nuclear reactor, the method comprising:
creating an ordered list of fuel rod types in an initial fuel bundle design, wherein the list ranks fuel rod types by frequency of occurrence in the initial fuel bundle design;
selecting a subset of fuel rods in the initial fuel bundle design, wherein the subset includes fuel rods of the types having a frequency below a predetermined frequency cutoff;
perturbing the subset of the fuel rod types in the initial fuel bundle design to generate perturbed fuel bundle designs corresponding to combinations and perturbations of the fuel rods in the subset;
selecting perturbed fuel bundle designs having fuel rods with allowable fuel enrichment types and an allowable average enrichment;
determining a difference between an enrichment value for each of the selected perturbed fuel bundle designs and an enrichment value of the initial fuel bundle design, wherein the enrichment value for each of the perturbed fuel bundle designs is determined using a response matrix to estimate an impact on local peaking and R-factors for the perturbed fuel bundle design; and
creating a group of the perturbed fuel bundle design having a determined difference less than a predetermined threshold difference value.

14. A method as in claim 13 further comprising determining if margin requirements are met based on the response matrix estimates for each possible combination and permutation of the filtered fuel bundle designs.

15. A method of claim 13 further comprising selecting one of the perturbed fuel bundle designs having a fewest number of rod enrichment types of the perturbed fuel bundle designs in the group.

16. A group of fuel bundle designs for a nuclear reactor core, the group comprising perturbed fuel bundle designs for a core of a nuclear reactor, wherein each of the perturbed fuel bundle designs has an enrichment value difference within a predefined tolerance range of an enrichment value difference of an initial fuel bundle design; each of the perturbed fuel bundle designs meeting predefined design constraints for bundles in the core, and each of the perturbed fuel bundle designs being a perturbation of the initial fuel bundle design, wherein the fuel bundle designs are applied to create fuel bundles for the nuclear reactor core.

17. A group as in claim 16 wherein the perturbation is of a subset of the fuel rod types in the initial fuel bundle design and the subset corresponds to rods having rod types occurring at a frequency in the bundle less than a predefined threshold frequency.

18. A group as in claim 16 wherein the enrichment difference is between an enrichment value for the perturbed fuel bundle designs is determined using a response matrix to estimate an impact on local peaking and R-factors for the perturbed fuel bundle design.

19. A group as in claim 16 wherein the perturbed fuel bundle designs include designs having fewer types of fuel rods than the types of fuel rods in the initial fuel bundle.

20. A group as in claim 16 wherein the group consists of the perturbed fuel bundle designs.

* * * * *

UNITED STATES PATENT AND TRADEMARK OFFICE
CERTIFICATE OF CORRECTION

PATENT NO. : 7,472,045 B2 Page 1 of 1
APPLICATION NO. : 11/610197
DATED : December 30, 2008
INVENTOR(S) : Roland Jackson et al.

It is certified that error appears in the above-identified patent and that said Letters Patent is hereby corrected as shown below:

In Claim 1:

At Column 10, line 61, delete "design;" and insert --designs--

At Column 10, line 62, delete "design," and insert --design;--

Signed and Sealed this

Tenth Day of March, 2009

JOHN DOLL
*Acting Director of the United States Patent and Trademark Office*